United States Patent
Tsirkin

(10) Patent No.: US 10,051,087 B2
(45) Date of Patent: Aug. 14, 2018

(54) DYNAMIC CACHE-EFFICIENT EVENT SUPPRESSION FOR NETWORK FUNCTION VIRTUALIZATION

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 194 days.

(21) Appl. No.: 15/056,518

(22) Filed: Feb. 29, 2016

(65) Prior Publication Data

US 2017/0251082 A1    Aug. 31, 2017

(51) Int. Cl.
*G06F 15/16* (2006.01)
*H04L 29/06* (2006.01)
*H04L 29/08* (2006.01)

(52) U.S. Cl.
CPC .......... *H04L 67/42* (2013.01); *H04L 67/2842* (2013.01)

(58) Field of Classification Search
CPC .............................. H04L 67/42; H04L 67/2842
USPC ........................................................ 709/203
See application file for complete search history.

(56) References Cited

U.S. PATENT DOCUMENTS

| 6,279,046 | B1 | 8/2001 | Armstrong et al. |
| 6,671,830 | B2 | 12/2003 | Kaler et al. |
| 9,787,840 | B1* | 10/2017 | Neuer, III ............ H04M 3/5232 |
| 2010/0293555 | A1* | 11/2010 | Vepsalainen ............ G06F 9/546 |
| | | | 719/313 |
| 2015/0180730 | A1 | 6/2015 | Felstaine et al. |
| 2015/0227386 | A1 | 8/2015 | Fitzgerald et al. |
| 2015/0312116 | A1 | 10/2015 | Taheri et al. |
| 2015/0378762 | A1 | 12/2015 | Saladi et al. |
| 2016/0006675 | A1 | 1/2016 | Takase et al. |
| 2017/0300966 | A1* | 10/2017 | Dereszynski ...... G06Q 30/0254 |

FOREIGN PATENT DOCUMENTS

WO    2015/031866    3/2015

OTHER PUBLICATIONS

Bhatia et al., Memory-manager/Scheduler Co-design: Optimizing Event-driven Programs to Improve Cache Behavior, International Symposium on Memory Management, Jun. 2006, Ottawa, Canada, 2006 <inria-00353566>.

(Continued)

*Primary Examiner* — Kristie Shingles
(74) *Attorney, Agent, or Firm* — K&L Gates LLP

(57) ABSTRACT

A system and method for dynamic cache-efficient event suppression includes recording, by a system processor, a quantity of messages received from a client during an interval of time between at least two events of a plurality of events. The system processor is in communication with a shared memory having a register with a first field, a second field, and a third field. The system processor and the shared memory are included in a client-server system. The method further includes predicting whether an expected number of messages to be received from the client before a next event exceeds a first predetermined threshold value and selecting, based on the prediction, a value that is used to selectively operate the second field and the third field. The method also includes selectively operating the second field and the third field based on the selected value and storing the value to the first field.

19 Claims, 4 Drawing Sheets

(56) References Cited

OTHER PUBLICATIONS

Frank et al., "Event-Driven Virtual Machine for Business Integration Middleware," DOI: 10.1007/978-3-642-17358-5_41, Source DBLP, Conference: Service-Oriented Computing—8th International Conference, ICSOC 2010, San Francisco, CA, USA, Dec. 7-10, 2010, Proceedings [retrieved from the Internet <URL: https://www.researchgate.net/publication/221050800_Event-Driven_Virtual_Machine_for_Business_Integration_Middleware> on Feb. 11, 2016].

Fujitsu Software ServerView Suite, ServerView Event Manager, ServerView Operations Manager V7.10, Edition Jun. 2015, 178 pages.

Zhang et al., "A Self-Repairing Prefetcher in an Event-Driven Dynamic Optimization Framework," [retrieved from the Internet <URL: http://dl.acm.org/citation.cfm?id=1122392> on Feb. 11, 2016].

Zhang, "Event-Driven Multithreaded Dynamic Optimization," A dissertation submitted in partial satisfaction of the requirements for the degree Doctor of Philosophy in Computer Science, 2006, 192 pages.

* cited by examiner

DYNAMIC CACHE-EFFICIENT EVENT SUPPRESSION FOR NETWORK FUNCTION VIRTUALIZATION

BACKGROUND

The present disclosure relates generally to memory management of a client-server system for network function virtualization and, more particularly, for dynamic cache efficient event suppression. In emerging fields, such as network function virtualization, shared memory is a popular technique that may provide for low-latency communication.

In computer systems, shared memory may refer to memory that can be accessed simultaneously by different resources, such as computer hardware or software. In computer hardware, shared memory is typically random access memory (RAM) that is accessible from different central processing units (CPUs) in a multi-processor system. In computer software, shared memory generally refers to an area of RAM that is accessible to multiple processes or threads. In software systems, such availability allows a single copy of data to service multiple resources, instead of providing a separate copy of the data for each specific resource.

Virtual memory generally refers to a method of memory management where virtual memory addresses are mapped to physical memory addresses of a computer system. An operating system usually manages virtual address spaces and assignment of physical memory to virtual memory. Memory address translation is usually performed by a memory management unit (MMU) of a CPU. In virtual memory management, data sharing between different processes may typically be implemented by mapping a virtual address of each different process to the same physical memory address so that each process accesses the same copy of data.

A central processing unit (CPU) generally uses a CPU cache to reduce the average time to access data from the main memory by storing copies of the data from frequently used main memory locations. The cache in the CPU is a smaller and faster memory. When the CPU needs to read from or write to a location in main memory, it first checks whether a copy of that data is in the cache. However, when the data requested for processing by a component or application is not found in the cache, a cache miss occurs. A cache miss may refer to a failed attempt to read or write a piece of data in the cache. Each cache miss slows down the overall process by requiring the program or application to fetch the data from other cache levels or the main memory.

SUMMARY

The present disclosure provides new and innovative methods and systems for dynamic cache-efficient event suppression. For example, an example system includes a shared memory having a register. The register includes a first field, a second field, and a third field. The system also includes a system processor, which is in communication with the shared memory. The system processor is configured to receive a plurality of messages and a plurality of events from a client, and record a quantity of messages received from the client during an interval of time between at least two events of the plurality of events. The shared memory is also in communication with the client. The system processor is also configured to predict whether an expected number of messages to be received before a next event exceeds a first predetermined threshold value and configured to select based on the prediction a value that is used to selectively operate the second field and the third field. The system processor is further configured to selectively operate the second field and the third field based on the selected value and to store the value to the first field.

In an example embodiment, a method includes recording, by a system processor, a quantity of messages received from a client during an interval of time between at least two events of a plurality of events. The system processor is in communication with a shared memory having a register with a first field, a second field, and a third field. The system processor and the shared memory are included in a client-server system. The shared memory is also in communication with the client. The method further includes predicting, by the system processor, whether an expected number of messages to be received from the client before a next event exceeds a first predetermined threshold value and selecting, by the system processor, based on the prediction, a value that is used to selectively operate the second field and the third field. The method also includes selectively operating the second field and the third field based on the selected value and storing the value to the first field.

Additional features and advantages of the disclosed methods and system are described in, and will be apparent from, the following Detailed Description and the Figures.

DETAILED DESCRIPTION OF EXAMPLE EMBODIMENTS

Figure 1:
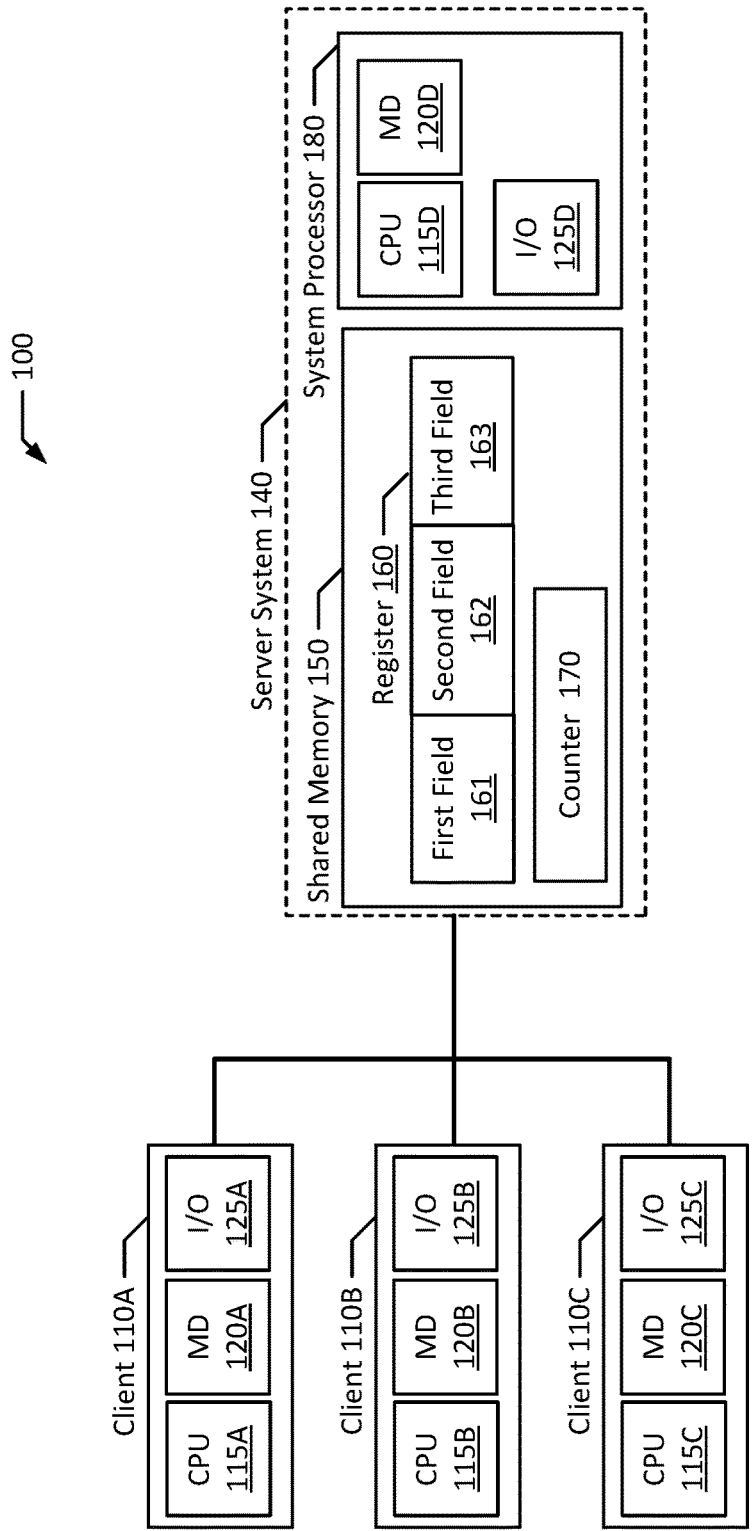
FIG. 1 is a block diagram of an example client-server system according to an example embodiment of the present disclosure.

FIG. 1 depicts a high-level component diagram of an example client-server system 100 in accordance with one or more aspects of the present disclosure. The client server system 100 may include a server system 140 and a client 110A-C. The server system 140 may include a shared memory 150 and a system processor 180. The client 110A-C and the system processor 180 may include a physical processor (e.g., CPU 115A-D) communicatively coupled to a memory device (e.g., MD 120A-D) and an input/output device (e.g., I/O 125A-D). The shared memory 150 may also include a register 160 and a counter 170. The register may include a first field 161, a second field 162, and a third field 163.

As used herein, physical processor or processor 115A-D may refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). As discussed herein, a memory device 120A-D refers to a volatile or non-volatile memory device, such as RAM, ROM, EEPROM, or any other device capable of storing data. Local connections within each client and the system processor, including the connections between a processor 115A-D and a memory device 120A-D may be provided by one or more local buses of suitable architecture, for example, peripheral component interconnect (PCI).

The shared memory 150 is in communication with the client 110A-C. In a typical example embodiment, the client and the server are on the same physical system. In an example embodiment, the connection between the client 110A-C and the shared memory may be provided by one or more local buses of suitable architecture, for example, peripheral component interconnect (PCI). In another example embodiment, the client 110A-C and the shared memory 150 may communicate via a network. For example, the client 110A-C and the shared memory 150 may communicate through a network using a remote direct memory access (RDMA). The network may be a public network (e.g., the Internet), a private network (e.g., a local area network (LAN) or wide area network (WAN), or a combination thereof.

In an example embodiment, one or more of the client 110A-C and the server system 140 may run in a virtualized system, by executing a software layer (e.g., hypervisor) above the hardware and below one or more virtual machines. In an example embodiment, the processor 115A-D may be a virtual CPU.

The system processor 180 is in communication with the shared memory 150. In an example embodiment, the system processor 180 is configured to receive a plurality of messages and a plurality of events from the client 110A-C. An event may be generated to notify the system processor 180 that there are other messages available. The system processor 180 is further configured to record a quantity of messages received from the client 110A-C during an interval of time between at least two events of the plurality of events. In an example embodiment, the system processor 180 is configured to predict whether an expected number of messages to be received from the client 110A-C before a next event exceeds a first predetermined threshold value. The system processor 180 is also configured to select based on the prediction a value that is used to selectively operate the second field 162 and the third field 163. The system processor 180 is further configured to selectively operate the second field 162 and the third field 163 based on the selected value and configured to store the value to the first field 161. The system processor 180 may selectively operate the second field 162 and the third field 163 by, for example, writing, reading, updating, and/or accessing the respective fields.

In an example embodiment, the client 110A-C is configured to read the register 160 to determine whether to send one of the plurality of events to the system processor 180. The counter 170 is configured to have a set value. In an example embodiment, the system processor 180 is configured to decrement the set value when the expected number of messages for the next event does not exceed the first predetermined threshold value. The set value in the counter 170 can be any value desired. In an example embodiment, the set value may be 64.

In an example embodiment, the system processor 180 is configured to select the third field 163 when the set value exceeds a second predetermined threshold value. In a further example embodiment, the system processor 180 is configured to select the second field 162 when the set value does not exceed the second predetermined threshold value. The first predetermined threshold value can be set to any value desired. In an example embodiment, the first predetermined threshold value is 1. In this embodiment, for example, if the expected number of messages to be received from the client does not exceed 1, the set value in the counter 170 can be decremented by the system processor 180. In an example embodiment, the term "exceed" may mean that a value is greater than a predetermined threshold value. In another example embodiment, the term "exceed" may mean that a value is greater than or equal to a predetermined threshold value.

The second predetermined threshold value can be set to any value desired. In an example embodiment, the second predetermined threshold value is 0. In this embodiment, for example, if the set value in the counter 170 exceeds 0, the third field 163 can be selected by the system processor 180. If the set value in the counter does not exceed 0, the second field 162 can be selected by the system processor 180.

In an example embodiment, the second field 162 is configured to be written by the system processor 180 to disable one of the plurality of events when the system processor 180 starts polling the shared memory 150. The second field 162 is further configured to be written by the system processor 180 to enable one of the plurality of events when the system processor 180 stops polling the shared memory 150. As used herein, enabling or disabling events may mean that the system processor 180 is enabled or disabled to receive or process events from the client 110A-C.

In an example embodiment, the third field 163 is configured to automatically disable one of the plurality events when the system processor 180 starts polling the shared memory 150. The third field 163 is further configured to be written by the system processor 180 to enable one of the plurality events when the system processor 180 stops polling the shared memory 170. In an example embodiment, the system processor 180 starts polling the shared memory 150 when it receives an event and stops polling when there are no more messages to receive from the client.

In an example embodiment, the first field 161 may be a mode register. The second field 162 may be an enable/disable register. The enable/disable register may have an enable value, and a disable value. For example, the enable/disable register may have two values (e.g., 0, 1), with one value for enable and the other value for disable. In an example embodiment, the first field 161 and/or the second field 161 may be a single bit register. In another example embodiment, the first field 161 and/or the second field 161 may be a multiple bit register. In an example embodiment, the third field 163 may be an enable/auto-disable register. In an example embodiment, the third field may be a sixteen bit register. In an example embodiment, the first, second, and third fields can be combined in a single thirty-two bit register. In an example embodiment, the register 160 may be a flags register.

In an example embodiment, the first field 161 may comprise a value in the second field 162. For example, the first field 161 may have three values (e.g., 00, 01, 11) indicating enable, disable, and use the third field.

In a client-server environment using the shared memory, an event created and sent from a client to a server system may cause cache misses for both the client and the server because, for each event, the server may have to write into memory. For example, cache coherency protocols, which are typically used on systems with a CPU cache, may require writing into memory if a value in a memory was previously accessed by a client from a different CPU. Additionally, executing a memory write by the server may invalidate the client cache, and may require reading from the memory if a value in the memory is later accessed by a client from a different CPU. In a system just using an enable/disable register, if there is one message per event, the system does not need to disable the events, but if there are many messages arriving in a short period of time, the system may need to disable events after receiving the event to avoid the risk of receiving many events, which are expensive. Then, if the system receives just one message per event, the server may then need to enable the event again. Therefore, for example, there may be at least two cache misses in this situation because when the server disables or enables events, the server may need to execute two writes into the memory. Also, there may be another cache miss from a client when the client attempts to read the changed value in the memory. In a system just using an auto-disable register, although it may not need to execute a write instruction into the memory to disable events, there still can be a cache miss because the server needs to write into the memory when it enables the events. If the system receives one message per event, the system needs to execute a write instruction for each message, causing a cache miss. Also, there may be another cache miss from a client when the client attempts to read the changed value in the memory. In a network function virtualization (NFV) system, the workload is dynamic and the number of messages per event also changes dynamically. The above described configuration and client-server system operations advantageously allow the system processor 180 to switch the mode dynamically depending on the workloads in the system such that it reduces the number of expensive cache misses. Furthermore, the present disclosure advantageously allows the client-server system to be used for network function virtualization (NFV) workloads with greater manageability.

In an example embodiment, the client 110A-C, may change its role with the system processor 180, and may become part of the server system 140 depending on the requests sent from system processor 180. In other words, a client 110A-C and the system processor 180 may have a reversal of roles, where the server becomes a client and the client becomes a server. For example, the processor 115A-C in the client 110A-C may perform the functions that the system processor 180 is configured to perform (e.g., receiving messages, recording the messages, predicting an expected number of messages, selecting a value, storing the value to a first field, and selectively operating based on the value) as described above.

Figure 2:
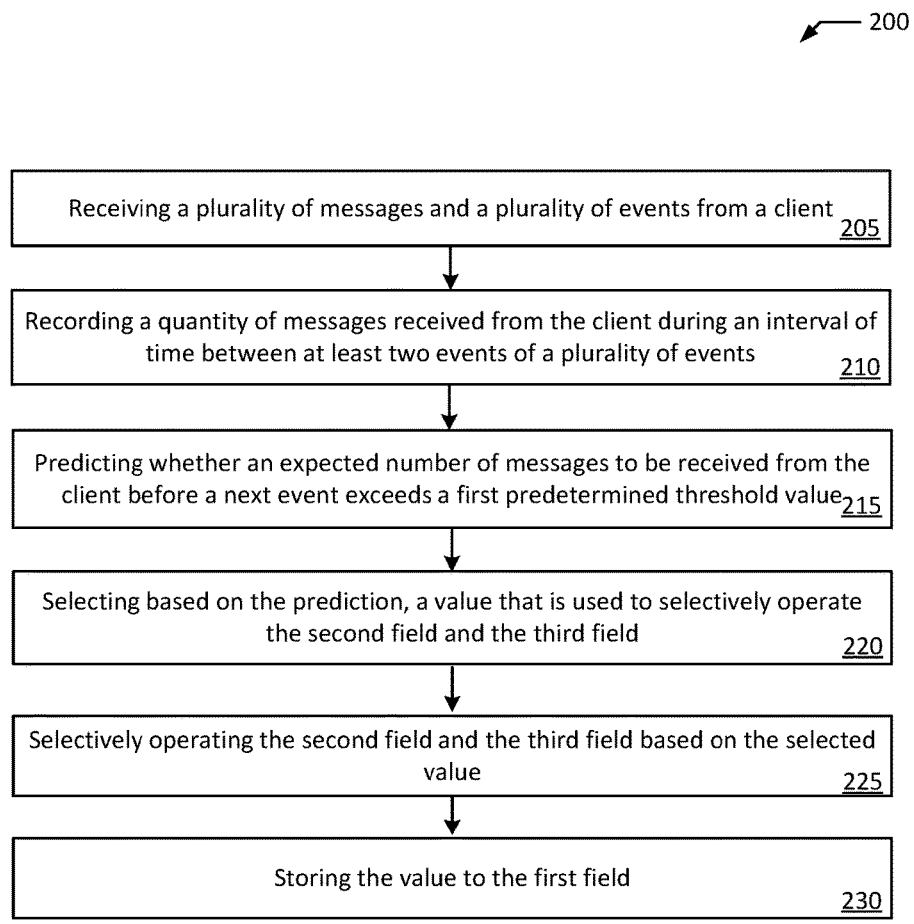
FIG. 2 is a flowchart illustrating an example method of event suppression according to an example embodiment of the present disclosure.

FIG. 2 shows a flowchart of an example method 200 for using the first 161, second 162, and third fields 163 for dynamic cache efficient event suppression. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional. The method 200 may be performed by the system processor 180 that may include hardware (circuitry, dedicated logic, etc.), software, or a combination of both.

In the illustrated example embodiment, the system processor 180 may receive a plurality of messages and a plurality of events from a client 110A-C (block 205). In an example embodiment, the system processor 180 may record a quantity of messages received from a client during an interval of time between at least two events of a plurality of events (block 210). In an example embodiment, the system processor 180 may record a quantity of messages for several most recent events. For example, as the plurality of messages are received in block 205, the system processor 180 determines the quantity of messages for each time interval. In an example embodiment, the system processor 180 may be in communication with a shared memory 150 having a register 160 with a first field 161, a second field 162, and a third field 163. The system processor 180 and the shared memory 150 may be included in a server system 140. The shared memory 150 may be in communication with the client 110A-C.

In an example embodiment, the system processor 180 may predict whether an expected number of messages to be received from the client 110A-C before a next event exceeds a first predetermined threshold value (block 215). In an example embodiment, the system processor 180 may set the counter 170 located in the shared memory 150 for a set value. The system processor 180 may decrement the set value when the expected number of messages for the next event does not exceed the first predetermined threshold value.

In an example embodiment, the system processor 180 may select, based on the prediction, a value that is used to selectively operate the system processor 180 based on the second field 162 and the third field 163 (block 220). In an example embodiment, the system processor 180 may select a value that is used to select the third field 163 when the set value exceeds a second predetermined threshold value. In another example embodiment, the system processor 180 may select a value that is used to select the second field 162 when the set value does not exceed the second predetermined threshold value.

In an example embodiment, the system processor may selectively operate the second field and the third field based on the selected value (block 225). The system processor 180 may store the selected value to the first field 161 (block 230). In an example embodiment, the system processor 180 may select a value to be written in the second field 162 or the third field 163 based on the prediction and store the value in the second field 162 or the third field 163 before the value selected in block 220 is stored in the first field 161. In an example embodiment, if the selected value in block 220 points to the second field 162, the system processor 180 may write the second field 162 to disable one of the plurality of events when the system processor 180 starts polling the shared memory 150, and may write the second field 162 to enable one of the plurality of events when the system processor 180 stops polling the shared memory 150. In an example embodiment, if the selected value in block 220 points to the third field, the system processor 163 may automatically disable one of the plurality events when the system processor 180 starts polling the shared memory 150, and the system processor 180 may write the third field 163 to enable one of the plurality events when the system processor stops polling the shared memory 150. In an example embodiment, the client 110A-C may read the register 160 to determine whether to send one of the plurality of events. In an example embodiment, these steps can be iteratively repeated such that the value(s) stored in the register at one point can be used at a later time.

Figure 3:
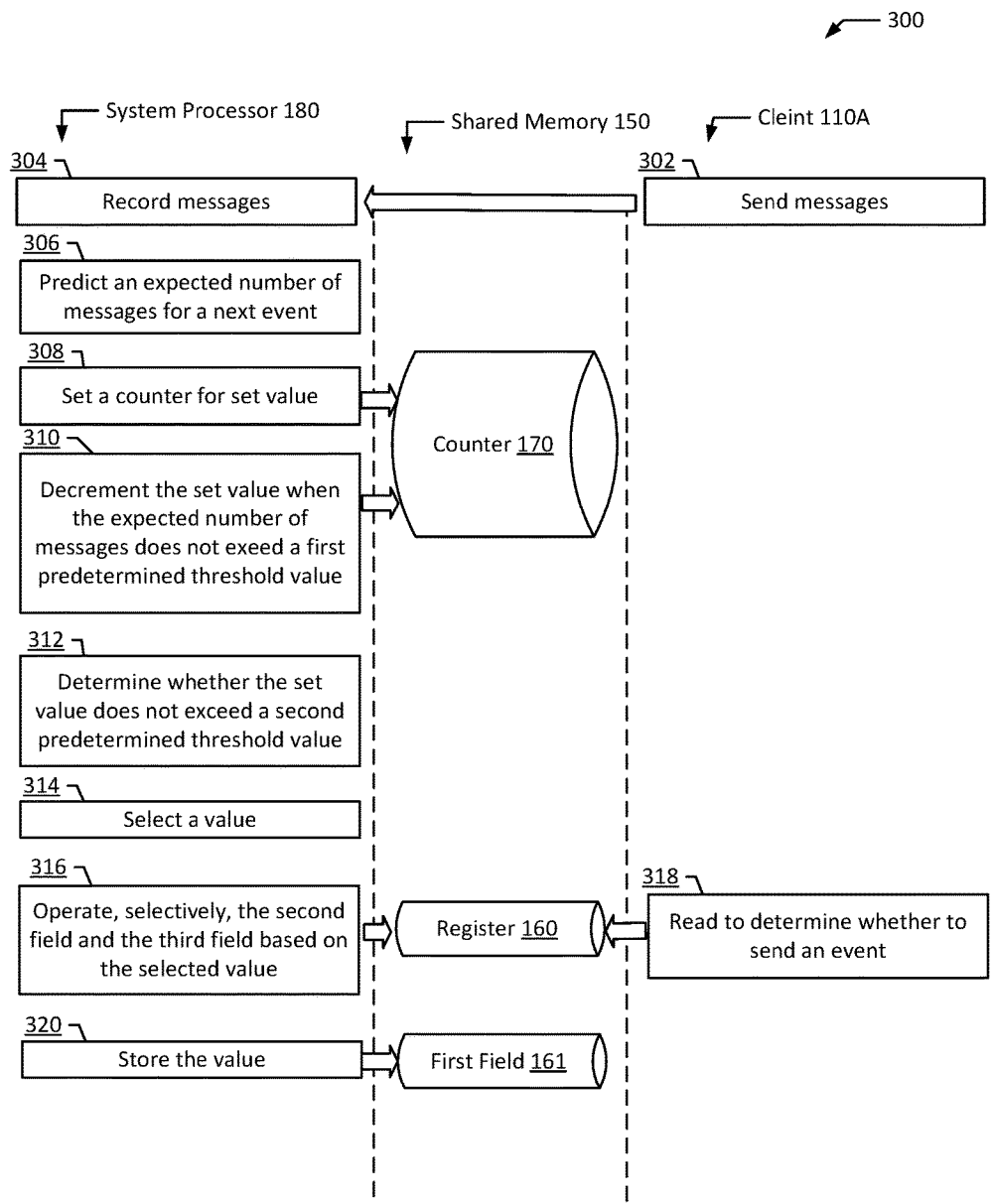
FIG. 3 is a flow diagram illustrating an example process for using the system to suppress events according to an example embodiment of the present disclosure.

FIG. 3 illustrates a flow diagram of an example method 300 for dynamic cache efficient event suppression according to an example embodiment of the present disclosure. Although the example method 300 is described with reference to the flow diagram illustrated in FIG. 3, it will be appreciated that many other methods of performing the acts associated with the method may be used. For example, the order of some of the blocks may be changed, certain blocks may be combined with other blocks, and some of the blocks described are optional. The method 300 may be performed by the system processor 180 that may include hardware (circuitry, dedicated logic, etc.), software, or a combination of both.

In the illustrated example embodiment, the client 110A sends messages to the system processor 180 (block 302). The system processor 180 records a quantity of messages received from the client 110A during an interval of time between at least two events of a plurality of events (block 304). The system processor 180 predicts an expected number of messages to be received from the client by a next event (block 306). The system processor 180 sets the counter 170 located in the shared memory 150 for a set value (block 308). The system processor 180 decrements the set value in the counter 170 when the expected number of messages for the next event does not exceed the first predetermined threshold value (block 310). The system processor 180 determines whether the set value does not exceed a second predetermined threshold value (block 312). The system processor 180 selects a value that is used to selectively operate the system processor based on the second field 162 and the third field 163 (block 314). In an example embodiment, the system processor 180 may select a value that is used to select the third field 163 when the set value exceeds the second predetermined threshold value. In another example embodiment, the system processor 180 may select a value that is used to select the second field 162 when the set value does not exceed the second predetermined threshold value.

The system processor 180 selectively operates the second field 162 and the third field 163 based on the selected value (block 316). The client 110A reads the register 160 to determine whether to send one of the plurality of events (block 318) The system processor 180 stores the selected value to the first field 161 (block 320). In an example embodiment, if the selected value in block 314 points to the second field 162, the system processor 180 may write the second field 162 to disable one of the plurality of events when the system processor 180 starts polling the shared memory 150, and may write the second field 162 to enable one of the plurality of events when the system processor 180 stops polling the shared memory 150. In an example embodiment, if the selected value in block 314 points to the third field, the system processor 163 may automatically disable one of the plurality events when the system processor 180 starts polling the shared memory 150, and the system processor 180 may write the third field 163 to enable one of the plurality events when the system processor stops polling the shared memory 150. In an example embodiment, these steps can be iteratively repeated such that the value(s) stored in the register at one point can be used at a later time.

Figure 4:
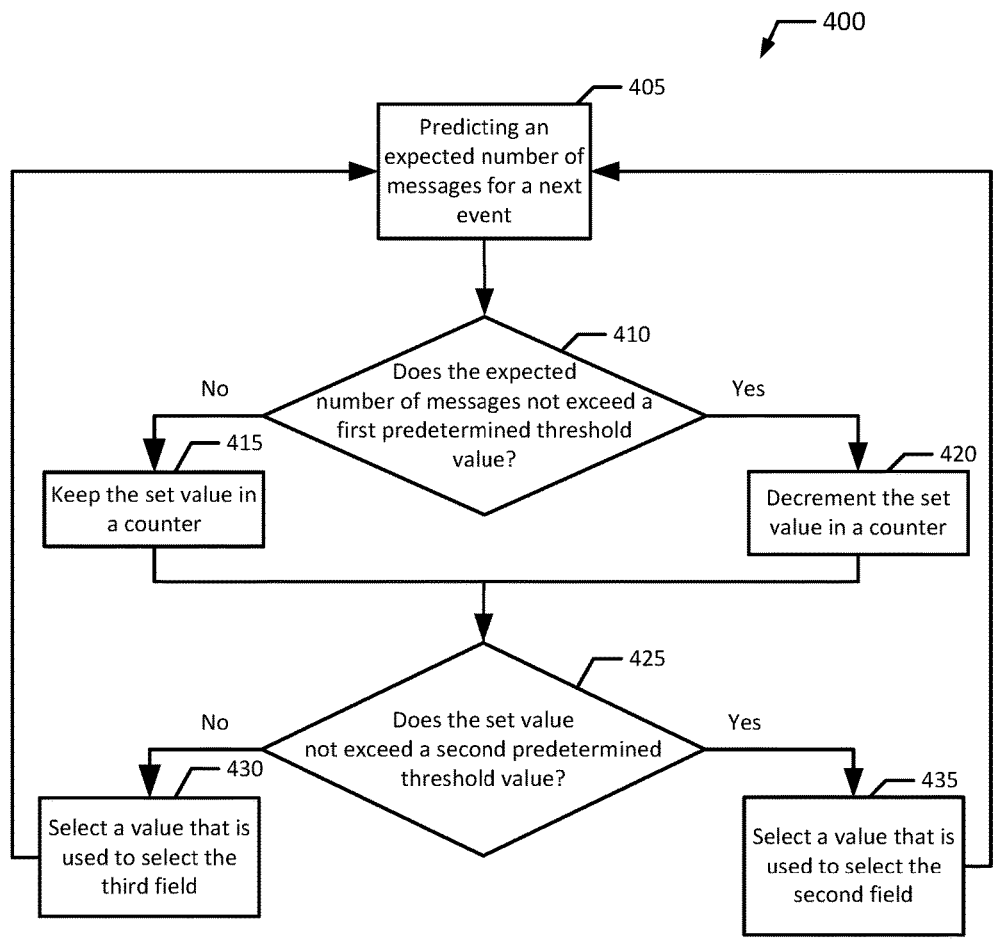
FIG. 4 is a flow chart illustrating an example predicting process using the system processor according to an example embodiment of the present disclosure.

FIG. 4 illustrates a flowchart of an example method 400 for predicting and selecting processes according to an example embodiment of the present disclosure. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional. The method 400 may be performed by the system processor 180 that may include hardware (circuitry, dedicated logic, etc.), software, or a combination of both.

In the illustrated example embodiment, the system processor 180 predicts an expected number of messages to be received from the client 110A-C before a next event (block 405). The system processor 180 may determine whether the expected number of messages does not exceed a first predetermined threshold value (block 410). If the expected number of messages does not exceed the first predetermined threshold value, the system processor 180 may decrement the set value in the counter 170 (block 420). For example, if the initial set value was 64, it could be decremented to be 63, 62, 61, and so on. If the expected number of message exceeds the first predetermined threshold value, the system processor 180 may maintain, without changing, the set value in the counter 170 (block 415). In an example embodiment, the system processor 180 may determine whether the set value does not exceed a second predetermined threshold value (block 425). If the set value does not exceed the second predetermined threshold value, the system processor may select a value that is used to select the second field (block 435). For example, if the second predetermined threshold value is 0, the system processor may select a value pointing to the second field when the set value does not exceed 0. If the set value exceeds the second predetermined threshold value, the system processor 180 may select a value that is used to select the third field (block 430). In an example embodiment, the system processor 180 stores the selected value to the first field 161. Using the value selected in blocks 430 and 435, the system processor 180 selectively operates the second field 162 and the third 163. In an example embodiment, the system processor 180 may repeat the prediction and selection processes for each event. In another example embodiment, the system processor 180 may repeat the prediction and selection processes for each message. In an example embodiment, the set value in the counter 170 may be reset after some time period (e.g., 100 milliseconds) or after a predetermined number of events (e.g., 1000 events).

As described in the present disclosure, using a register with three fields enables dynamic cache efficient event suppression for more efficient management of a client-server system for network function virtualization.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A client-server system comprising:
a shared memory having a register, the register including a first field, a second field, and a third field; and
a system processor, in communication with the shared memory,
wherein the system processor is configured to:
receive a plurality of messages and a plurality of events from a client,
record a quantity of messages received from the client during an interval of time between at least two events of the plurality of events, wherein the shared memory is in communication with the client,
predict whether an expected number of messages to be received before a next event exceeds a first predetermined threshold value,
select based on the prediction a value that is used to selectively operate the second field and the third field,
selectively operate the second field and the third field based on the selected value, wherein the third field is configured to automatically disable one of the plurality of events when the system processor starts polling the shared memory, and configured to be written by the system processor to enable one of the plurality of events when the system processor stops polling the shared memory, and
store the value to the first field.

2. The client-server system of claim 1, wherein the client is configured to read the register to determine whether to send one of the plurality of events to the system processor.

3. The client-server system of claim 1, further comprising a counter having a set value, the counter being located in the shared memory, wherein the system processor is configured to decrement the set value when the expected number of messages for the next event does not exceed the first predetermined threshold value.

4. The client-server system of claim 3, wherein the system processor is configured to select the third field when the set value exceeds a second predetermined threshold value.

5. The client-server system of claim 3, wherein the system processor is configured to select the second field when the set value does not exceed the second predetermined threshold value.

6. The client-server system of claim 5, wherein the second predetermined threshold value is 0.

7. The client-server system of claim 1, wherein the first predetermined threshold value is 1.

8. The client-server system of claim 1, wherein the second field is configured to be written by the system processor to disable one of the plurality of events when the system processor starts polling the shared memory, and configured to be written by the system processor to enable one of the plurality of events when the system processor stops polling the shared memory.

9. The client-server system of claim 1, wherein the first field is a mode register.

10. The client-server system of claim 1, wherein the second field is an enable/disable register.

11. The client-server system of claim 1, wherein the third field is an enable/auto-disable register.

12. The client-server system of claim 1, wherein the first field comprises a value in the second field.

13. A method comprising:
recording, by a system processor, a quantity of messages received from a client during an interval of time between at least two events of a plurality of events, wherein the system processor is in communication with a shared memory having a register with a first field, a second field, and a third field, wherein the system processor and the shared memory are included in a client-server system, wherein the shared memory is in communication with the client;
predicting, by the system processor, whether an expected number of messages to be received from the client before a next event exceeds a first predetermined threshold value;
selecting, by the system processor, based on the prediction, a value that is used to selectively operate the second field and the third field;
selectively operating, by the system processor, the second field and the third field based on the selected value, wherein the third field is configured to automatically disable one of the plurality of events when the system processor starts polling the shared memory, and configured to be written by the system processor to enable one of the plurality of events when the system processor stops polling the shared memory; and
storing the value to the first field.

14. The method of claim 13, further comprising, reading, by the client, the register to determine whether to send one of the plurality of events.

15. The method of claim 13, further comprising,
setting, by the system processor, a counter for a set value, wherein the counter is located in the shared memory; and
decrementing, by the system processor, the set value when the expected number of messages for the next event does not exceed the first predetermined threshold value.

16. The method of claim 15, wherein the system processor is configured to select the third field when the set value exceeds a second predetermined threshold value.

17. The method of claim 15, wherein the system processor is configured to select the second field when the set value does not exceed the second predetermined threshold value.

18. The method of claim 17, wherein the first predetermined threshold value is 1 and the second predetermined threshold value is 0.

19. A computer readable medium including instructions that, when executed by a system processor that is in communication with a shared memory, causes the system processor to:
record a quantity of messages received from a client during an interval of time between at least two events of a plurality of events, wherein the shared memory includes a register with a first field, a second field, and a third field, wherein the system processor and the shared memory are included in a client-server system, wherein the shared memory is in communication with the client;
predict whether an expected number of messages to be received from the client before a next event exceeds a first predetermined threshold value;
select based on the prediction, a value that is used to selectively operate the second field and the third field;
selectively operate the second field and the third field based on the selected value, wherein the third field is configured to automatically disable one of the plurality of events when the system processor starts polling the shared memory, and configured to be written by the system processor to enable one of the plurality of events when the system processor stops polling the shared memory; and store the value to the first field.

* * * * *